3,499,881
ELECTROPLATABLE POLYOLEFINS
Wassily Poppe and Habet M. Khelghatian, Springfield, Pa., assignors to Avisun Corporation, Philadelphia, Pa., a corporation of Delaware
No Drawing. Filed May 3, 1967, Ser. No. 635,661
Int. Cl. C08f 45/00
U.S. Cl. 260—93.7     8 Claims

ABSTRACT OF THE DISCLOSURE

In the art of electroplating polyolefins, adhesion of the metal to the surface of the polyolefin article is enhanced by incorporating into the polyolefin from 0.25 to 1.5% by weight of a compatible sulfur compound such as dilauryl or distearyl thiodipropionate and a sulfate of a metal of Group II of the periodic system such as barium sulfate.

---

The present invention relates to polyolefin compositions and more particularly to polyolefin compositions which are suitable for electroplating. In another embodiment, the present invention relates to the modification of polyolefins to make surfaces of articles prepared from such polyolefin compositions improved in their utility for electroplating.

The problem of causing ink, paint or other types of coatings to adhere to a polyolefin surface is well-known. Various methods and means have been suggested for improving the adhesion of inks, paints, metals and similar coating materials to plastic surfaces. In general, the approach to solving the problem of adhesion to a polyolefin surface has been to modify the surface of the finished article by an oxidizing treatment of some kind. Although some of the methods based on surface oxidation of a polyolefin have been proven to be satisfactory for imparting printability to a polyolefin surface such treatment, in general, has found only limited success in causing a superior bond between the surface of the polyolefin article and metal plated onto the surface. In addition to the chemical nature of the surface, an additional problem in electroplating polyolefin articles comprises the uneven surface of polyolefin articles normally obtained in injection molding or compression molding of polyolefin articles. Surface roughness prevents a uniform adhesion of the metal plate to the polyolefin article thereby decreasing the bond strength of the metal plate to the article and furthermore detracting from the appearance of the metal plated article. The electroplating of a polyolefin article in which the metal plate, having thicknesses in the range of 1 mil is tightly bonded to the polyolefin substrate constitutes, however, a highly desirable goal in view of the more recently developed polyolefins which can be considered engineering plastics and thus substitutes for zinc die casts or other metals. An electroplated metal coating having good adhesion to the plastic substrate, furthermore, improves the structural properties of the plastic thereby enhancing its use as a substitute for metals. The advantages of using polyolefins in such applications include lower cost of materials, cheaper tooling and tool maintenance, lower finishing costs in buffing and polishing and lower shipping cost. The use of polyolefins, furthermore, allows greater versatility of product design and gives a more corrosion-resistant end product. In the aeronautic and aerospace fields, the substitution of plastics for metal can result in weight savings which is always of vital importance. Increased adhesions between the metal plate and the polyolefin substrate causes improved physical properties such as flexural modulus, impact strength and temperature deflection.

It is, therefore, an object of the present invention to provide a novel polyolefin composition.

It is another object of the present invention to provide novel polyolefin compositions exhibiting increased adhesion to metals when employed in conventional electroplating processes for nonconducting surfaces.

It is a further object of the present invention to provide metal plated polyolefin articles exhibiting high bond strength between the polyolefin substrate and the metal plate.

It is still another object of the present invention to provide a process for electroplating polyolefin articles.

Other objects will become apparent from the following description and claims.

The polyolefins compositions of the present invention comprise polyolefins containing from 0.25 to 1.5% and preferably from 0.3 to 1.0% by weight of the polyolefin of a compatible sulfur compound and containing from 10 to 60% and preferably from 20 to 40 % by weight of the polyolefin composition of a sulfate of a metal of Group II of the Periodic Table of Elements, said sulfate having average particle sizes of less than 10 microns.

The term "compatible" employed to characterize the sulfur additive in the compositions of the present invention, is meant to define a material which can be uniformly distributed throughout the polyolefin composition within the concentration ranges indicated and on distribution results in a single phase composition so far as determinable by visual examination. Preferably the additive is dispersible in the polyolefin on a molecular scale so that the composition appears homogeneous even under microscopic examination.

Sulfur compounds which are compatible with the polyolefin in the above indicated concentration ranges are generally compounds in which the sulfur is bonded to two methylene groups or similar hydrocarbon moieties. Thioalkanoic esters in which the sulfur is also bonded to a hydrocarbon radical and particularly diesters of thiodialkanoic acids constitute the preferred compatible sulfur additive employed in combination with the metal sulfate to form the polyolefin composition of the present invention. The dialkyl thiodialkanoates which are compatible with the polyolefin are also well-known antioxidants for polyolefins. However, when used as antioxidants, the compounds are employed in generally lower concentrations than in the present invention. Specific examples of sulfur compounds useful as additives in the polyolefins compositions of the present invention include dilauryl thiodipropionate and distearyl thiodipropionate.

The metal sulfates employed in the polyolefin compositions of the present invention are sulfates of metals in Group II of the Periodic Table of Elements and preferably alkaline earth metal sulfates; preferred metal sulfates therefore include magnesium sulfate, calcium sulfate, strontium sulfate, and barium sulfate. The most preferred sulfate is barium sulfate. In order to be useful in the electroplating of polyolefin articles containing such metal sulfate it is essential that the sulfate be employed in finely divided form. Thus the average particle size of the metal sulfate added to the polyolefin should be 10 microns or less. Metal sulfates having such particle sizes are generally obtained by precipitation from solutions using techniques well-known in the art.

Using the combination of the compatible sulfur compound and the incompatible solid metal sulfate a significant improvement in the adhesion of metal plate to the polyolefin substrate is obtained. The reason for this improvement in bond strength between the metal plate and the polyolefin substrate is not clearly understood as yet. However, it is believed that both the compatible sulfur compound as well as the metal sulfate alter the chemical structure of the surface to thereby increase adhesion and that in addition the presence of the metal sulfate results in a polyolefin article having a smoother and therefore better surface for electroplating.

The polyolefins which can be modified by the addition of the compatible sulfur compound and the metal sulfate to increase their utility in electroplating comprise in general all polymers obtained by the addition polymerization of a hydrocarbon containing terminal ethylenic unsaturation. Although vinyl aromatic polymers such as polystyrene can be improved for electroplating by using the above described additives, the polyolefins preferably employed comprise polymers which contain a major proportion (i.e., greater than 50%) of an aliphatic olefin, having from 2–8 carbon atoms. Such polyolefins, therefore, include polyethylene, polypropylene, ethylene propylene copolymers, ethylene butene-1, copolymers, polybutene - 1, poly(4-methylpentene-1), poly(3-methylbutene-1), and the like. The term polyolefin as used herein is, furthermore, intended to include copolymers of hydrocarbon monomers with copolymerizable polar monomers in which such functional monomers constitute a minor proportion of the copolymer. Functional monomers frequently employed in combination with hydrocarbon monomers are in particular the acrylic monomers such as methyl methacrylate, ethyl acrylate, and acrylonitrile and the vinyl esters such as vinyl acetate. The modified polyolefin compositions of the present invention, furthermore, can contain inert inorganic fillers such as asbestos fibers, glass fibers, carbon, silica, in addition to the metal sulfate above described. Furthermore, the polyolefin compositions of the present invention can contain other additives normally added to the polyolefin in order to improve the fabricability or solid state properties of such polyolefin.

The compositions of the present invention are formed by methods heretofore employed for the addition of modifiers and solids to a polyolefin. Such methods generally involve a melt blending of the polymer and the additive in equipment such as extruders, stirred mixers or milling rolls. However, other methods of distributing additives in the polyolefins are not intended to be excluded. In blending the additives with the polyolefin, the same precautions against degradation of the polyolefin and additive heretofore practiced should also be observed in the formulation of the compositions of the present invention.

The modified polyolefins of the present invention are shaped into the article desired to be electroplated by any of the means heretofore employed for the preparation of such articles inclusive of which are compression molding and injection molding.

Although a variety of processes have been developed for the electroplating of nonconductive surfaces and in particular plastics, the same general steps are usually employed. Thus, the plating of particles made from the modified polyolefin of the present invention is generally conducted using the following steps:

(1) The surface to be plated is cleaned using a mild alkaline bath to remove oils, mold release agents, and fingerprints.

(2) The alkaline material retained by the surface is netralized using a mild acid.

(3) The clean surface is then chemically etched with a conditioner containing concentrated mineral acid such as sulfuric acid and chromic trioxide or a chromate.

(4) The resulting etched surface is sensitized with a readily oxidizable tin salt solution such as stannous chloride which causes tin to be absorbed on the surface.

(5) The surface is then activated or nucleated by treatment with an aqueous solution of a noble metal salt such as palladium chloride which forms a metallic film at discrete activated sites.

(6) The activated surface is subjected to electroless plating using copper, nickel, or cobalt as the metal. This is accomplished by immersing a treated surface in a solution of such metal salt containing in addition to the metal salt such as copper sulfate or nickel chloride, a reducing agent such as formaldehyde, trioxymethylene and the like. Sufficient copper, nickel or cobalt is deposited on the surface of the polyolefin article to achieve a continuous coating capable of conducting electricity.

(7) The electrodeposition of metal is then followed by conventionally plating the surface with copper, nickel and/or chromium or just nickel and chromium. The thickness of the electroplated coating is generally within the range of 0.1 to 1.5 mil.

It is, furthermore highly desirable if not essential to rinse and clean the surface being treated with water between each of the steps outlined and in some instances, it may also be desirable to dry the surface between the various treating steps. Since the various outlined steps employed in the electroplating of nonconducting surfaces and particularly plastic surfaces are well-known in the electroplating art no further description is deemed necessary for a full understanding of the present invention. The polyolefin compositions of the present invention can be employed in electroplating using any of the processes heretofore developed for electroplating of plastic and particularly polyolefin surfaces.

The polyolefin compositions of the present invention are as indicated particularly suitable in the electroplating of articles made from the composition in that they give rise to a greatly improved bond strength between the metal plate and the polyolefin substrate. Although the adhesion of the metal plate to the substrate can be measured by various tests, bond strength is preferably measured by the pull test in which two parallel cuts are made into the plated metal coating, ½ inch apart, an additional vertical cut is made to form a tab, one end of the resulting tab then being raised sufficiently to allow gripping by a tensile machine. The specimen is then placed into a tensile rig and the tab is pulled vertically from the surface. The force required to pull the tab is measured as the bond strength.

The present invention is further illustrated by the following examples in which all parts and percentages are by weight unless otherwise indicated.

EXAMPLE 1

To 100 parts of crystalline polypropylene having a melting point of 165° C. and a flow rate of 3.4 containing 0.10% by weight of the polyolefin of 2,6-ditertiary-butyl-4-methylphenol (a stabilizer) and 0.15% by weight of the polyolefin of calcium stearate (a mold release agent) is added 0.25% by weight of distearyl thiodipropionate and 20% by weight of the polyolefin composition of barium sulfate having an average particle size of about 8 microns. The polymer is melt-blended in an extruder causing the additives to be uniformly distributed throughout the polypropylene. The modified polypropylene is then molded into 3" x 2" x 110 mil plaques which are electroplated by the following process.

The plaques are immersed consecutively in a conditioner consisting of 40% sulfuric acid (96% concentration) 39.5% phosphoric acid (85% concentration), 3% chromium trioxide and 17.5% of water to which has been added, per liter of conditioner, 36 g. of an additive containing 64% of chromium trioxide and 36% of sodium hydrogen sulfate, for a period of 10 minutes at 85° C.; in a stannous chloride sensitizer solution containing per liter of solution 10 g. of stannous chloride and 40 ml. of HCl at ambient temperatures for 1 to 3 minutes; in an activator solution containing per gallon of solution 1 g. of palladium chloride and 10 ml. of HCl for a period of 1 to 2 minutes at ambient temperatures, and in an electroless copper plating solution containing per liter of solution 29 g. of copper sulfate, 140 g. of Rochelle salt, 40 g. of sodium hydroxide and 166 g. of formaldehyde (37% solution) at a temperature of 70° C. for a period sufficient to obtain a continuous coating capable of conducting electricity. Between each of the immersions described, the plaque was thoroughly rinsed with distilled water. The resulting plaque on washing with water is then electroplated with copper for about 20 minutes, at a current density of approximately 30 amps./sq. ft., resulting in a 1 mil coating of copper on the plaque. A bond strength of 4.2 lbs./in. is obtained.

In the absence of either the thiodipropionate or the metal sulfate or in the absence of both additives using the described electroplating technique, the bond between the polypropylene substrate and the copper plate is not strong enough to obtain a significant measurement of bond strength, i.e., less than 1 lb./in.

EXAMPLE 2

The procedure of Example 1 is repeated using as additives for electroplating 0.75% by weight of the polypropylene of diluaryl thiodipropionate and 20% of barium sulfate. The bond strength of the copper plated plaque is in the range of 10 to 12 lbs./in.

Substantially similar results are obtained when distearyl thiodipropionate is employed instead of dilauryl thiodipropionate.

EXAMPLE 3

The procedure of Example 1 is repeated using as additives for electroplating, 0.5% by weight of the polyolefin of dilauryl thiodipropionate and 30% by weight of the polyolefin composition of barium sulfate. The bond strength of the copper plated plaques is in the range of 15 lbs./in.

EXAMPLE 4

The procedure of Example 3 is repeated, except that the polypropylene contained, in addition to the barium sulfate and dilauryl thiodipropionate, 0.5% by weight of Triton A–100, a commercially avaibale non-ionic detergent of isooctylphenyl polyethoxyethanol. A bond strength of 30 lbs./in. is obtained.

The foregoing examples have illustrated the formation and use of the novel polyolefin compositions of the present invention. It will be apparent that the specifically illustrated procedures can be equally well applied with other polyolefins and modifiers coming within the scope of the present invention. Similarly other electroplating methods are suitably employed with the modified polyolefins of the present invention. The foregoing examples are considered to be illustrative of the invention and it is not intended to limit the scope of the invention disclosed being obvious to those skilled in the art.

What is claimed is:

1. Modified olefin polymers of 1-alkenes having from 2–8 carbon atoms containing therein from 0.25 to 1.5% by weight of polyolefin of a dialkyl thiodialkanoate and from 20 to 60% by weight of the polymer composition of a sulfate of a metal selected from the group consisting of magnesium, calcium, strontium and barium said sulfate having an average particle size of not greater than 10 microns.

2. The modified polymer of claim 1 wherein the sulfur compound is a dialkyl ester of a thiodialkanoic acid and the metal sulfate is barium sulfate.

3. The modified polymer of claim 1 wherein the polymer is a polymer of propylene.

4. The modified polymer of propylene of claim 3 wherein the compatible sulfur compound is an ester of thiodipropionic acid and the metal sulfate is barium sulfate.

5. The modified propylene polymer of claim 4 wherein the ester of thiodipropionic acid is dilauryl thiodipropionate or distearyl thiodipropionate.

6. In the process of making a composition suitable for making an electroplatable polyolefin article, the step which comprises uniformly distributing throughout a polymer of 1-alkenes having from 2–8 carbon atoms from 0.25 to 1.5% by weight of said polymer of a dialkyl thiodialkanoate and from 20 to 60% by weight of the polyolefin composition of a metal sulfate wherein the metal is a metal selected from the group consisting of magnesium, calcium, strontium and barium said metal sulfate having an average particle size not greater than 10 microns.

7. The process of claim 6 wherein the metal sulfate is barium sulfate.

8. The process of claim 7 wherein the polyolefin is a polymer of propylene and the dialkyl thiodialkanoate is stearyl thiodipropionate or lauryl thiodipropionate.

References Cited

UNITED STATES PATENTS

| 2,044,954 | 6/1936 | Peirce | 106—306 |
| 3,038,878 | 6/1962 | Bell et al. | 260—45.85 |
| 3,344,113 | 9/1967 | Alheim | 260—45.85 |
| 3,386,948 | 6/1968 | Needham et al. | 260—45.85 |

OTHER REFERENCES

Condensed Chemical Dictionary (6th Ed.) (Reinhold) (N.Y.) (1961) pp. 39, 129, 207.

Modern Plastics Encyclopedia 1966 (September 1965) (McGraw-Hill) (N.Y.) pp. 592–594.

MORRIS LIEBMAN, Primary Examiner

H. H. FLETCHER, Assistant Examiner

U.S. Cl. X.R.

117—47, 227; 260—41, 94.9, 45.85